United States Patent
Zhu et al.

(10) Patent No.: US 11,888,993 B2
(45) Date of Patent: Jan. 30, 2024

(54) DIGITAL CERTIFICATE APPLICATION METHOD

(71) Applicant: Huawei Cloud Computing Technologies, Co., Ltd., Guizhou (CN)

(72) Inventors: Jintao Zhu, Xi'an (CN); Yucai Peng, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 478 days.

(21) Appl. No.: 17/223,462

(22) Filed: Apr. 6, 2021

(65) Prior Publication Data

US 2021/0226802 A1 Jul. 22, 2021

Related U.S. Application Data

(63) Continuation of application No. PCT/CN2020/089027, filed on May 7, 2020.

(30) Foreign Application Priority Data

May 7, 2019 (CN) .......................... 201910376653.2

(51) Int. Cl.
*G06F 21/00* (2013.01)
*H04L 29/06* (2006.01)
(Continued)

(52) U.S. Cl.
CPC .......... *H04L 9/3263* (2013.01); *H04L 9/0825* (2013.01); *H04L 9/0872* (2013.01); *H04L 9/3247* (2013.01)

(58) Field of Classification Search
None
See application file for complete search history.

(56) References Cited

U.S. PATENT DOCUMENTS

| | | | | |
|---|---|---|---|---|
| 10,797,888 B1 * | 10/2020 | Natarajan | ........... | H04L 63/0428 |
| 2013/0067220 A1 * | 3/2013 | Ando | ...................... | H04W 4/44 |
| | | | | 713/156 |

(Continued)

FOREIGN PATENT DOCUMENTS

| | | |
|---|---|---|
| CN | 102907039 A | 1/2013 |
| CN | 103973760 A | 8/2014 |

(Continued)

OTHER PUBLICATIONS

3GPP TR 33.885 V2.0.0 "3rd Generation Partnership Project; Technical Specification Group Services and System Aspects; Study on security aspects for LTE support of V2X services (Release 14)," Jun. 2017, 76 Pages.

(Continued)

*Primary Examiner* — Lisa C Lewis
(74) *Attorney, Agent, or Firm* — Conley Rose, P.C.

(57) ABSTRACT

A vehicle-to-everything terminal provides a vehicle-to-everything server with a security credential that can prove an identity of the vehicle-to-everything terminal, and requests the vehicle-to-everything server to apply for a certificate for the vehicle-to-everything terminal. The security credential may be a token preconfigured in the vehicle-to-everything terminal, or may be a digital signature of the vehicle. The vehicle-to-everything server performs identity verification on the vehicle-to-everything terminal based on the security credential. After the verification succeeds, the vehicle-to-everything server selects a proper certificate server to apply for a certificate for the vehicle-to-everything terminal.

24 Claims, 6 Drawing Sheets

(51) Int. Cl.
*H04L 9/32* (2006.01)
*H04L 9/08* (2006.01)

(56) References Cited

U.S. PATENT DOCUMENTS

| | | | |
|---|---|---|---|
| 2016/0008704 A1 | 1/2016 | Howland | |
| 2016/0087804 A1* | 3/2016 | Park | H04L 9/3268 |
| | | | 713/156 |
| 2016/0119151 A1 | 4/2016 | Park et al. | |
| 2018/0013751 A1* | 1/2018 | Park | H04L 63/105 |
| 2018/0316511 A1 | 11/2018 | Meyer et al. | |
| 2019/0123915 A1 | 4/2019 | Simplicio, Jr. et al. | |
| 2019/0263336 A1 | 8/2019 | Haga et al. | |
| 2019/0335304 A1* | 10/2019 | Yabuuchi | H04W 4/44 |
| 2021/0194866 A1* | 6/2021 | Chaudhury | H04L 63/0823 |

FOREIGN PATENT DOCUMENTS

| | | |
|---|---|---|
| CN | 103974255 A | 8/2014 |
| CN | 103986687 A | 8/2014 |
| CN | 105592098 A | 5/2016 |
| CN | 105656930 A | 6/2016 |
| CN | 106062847 A | 10/2016 |
| CN | 106161337 A | 11/2016 |
| CN | 106713326 A | 5/2017 |
| CN | 107171805 A | 9/2017 |
| CN | 107585115 A | 1/2018 |
| CN | 109040285 A | 12/2018 |
| CN | 109314646 A | 2/2019 |
| CN | 109688111 A | 4/2019 |

OTHER PUBLICATIONS

Benedikt Brecht et al.,"A Security Credential ManageMent System for V2X communications," arxiv.org, Cornell University Library, 201 Olin Library Cornell University Ithaca,NY 14853, Feb. 14, 2018, 26 pages.

LG Electronics, "Update of V2X attach identifier obfuscation solution in 6.3", 3GPP TSG SA WG3 (Security) Meeting #84 Jul. 25-29, 2016 Chennai (India),S3-161158, 5 pages.

Roshini, T.V. et al., "An Efficient Privacy Preserving scheduling in ANET using NS-2", Proceedings of 2018 International Conference on Emerging Trends and Innovations in Engineering and Technological Research (ICETIETR), 5 pages.

* cited by examiner

DIGITAL CERTIFICATE APPLICATION METHOD

CROSS-REFERENCE TO RELATED APPLICATIONS

This application is a continuation of International Patent Application No. PCT/CN2020/089027 filed on May 7, 2020 which claims priority to Chinese Patent Application No. 201910376653.2 filed on May 7, 2019. The disclosures of the aforementioned applications are hereby incorporated by reference in their entireties.

TECHNICAL FIELD

This application relates to the communications field, and in particular, to a digital certificate application method, apparatus, and system in the vehicle-to-everything field.

BACKGROUND

A PC5 interface in vehicle-to-everything is used for broadcast communication between vehicle-to-everything terminals, for example, between vehicles, between a vehicle and a pedestrian or a driver, and between a vehicle and an infrastructure. To improve security of a broadcast message transmitted through the PC5 interface and reduce a security threat and risk (for example, a risk at which the broadcast message is tampered), a vehicle-to-everything terminal applies to a certificate server for a short-term certificate, adds the short-term certificate to a to-be-sent message, and uses a private key corresponding to the short-term certificate to digitally sign the message, so as to provide integrity protection for the message.

According to requirements of European Union Cooperative Intelligent Transport System (C-ITS) credential management system (CCMS) and United States security credential management system (SCMS) related standards, a vehicle-to-everything terminal needs to switch between 10 to 100 short-term certificates every week, to prevent third-party tracing, thereby implementing privacy protection. In addition, during actual application, a plurality of certificate servers for certificate issuing are usually deployed. For example, different certificate servers are deployed in different regions and administrative divisions, or different certificate servers are deployed for issuing certificates with different permission levels. Therefore, the vehicle-to-everything terminal needs to be connected to certificate servers deployed based on dimensions such as different regions and authorization levels, to apply for short-term certificates. Complex deployment of certificate servers makes certificate obtaining more difficult for the vehicle-to-everything terminal, and storage of information about a plurality of certificate servers also affects performance of the vehicle-to-everything terminal to some extent.

SUMMARY

This application provides a digital certificate application solution concept. In the solution concept, a vehicle-to-everything server is used as an agent of a vehicle-to-everything terminal, and replaces the vehicle-to-everything terminal to apply to one or more certificate servers for pseudonym certificates. For the vehicle-to-everything terminal, this solution reduces certificate application complexity. For the certificate server, this solution reduces a security risk at which the certificate server is attacked when the certificate server faces massive vehicle-to-everything terminals.

Based on the foregoing solution concept, this application provides a digital certificate application method. A vehicle-to-everything terminal provides a vehicle-to-everything server with a security credential that can prove an identity of the vehicle-to-everything terminal and requests the vehicle-to-everything server to apply for a certificate for the vehicle-to-everything terminal. The security credential may be a token preconfigured in the vehicle-to-everything terminal, or may be a digital signature of the vehicle. The token may be information preconfigured in the vehicle-to-everything terminal by a vehicle-to-everything terminal production enterprise server, and the token includes an identifier of the vehicle-to-everything terminal. The vehicle-to-everything server performs identity verification on the vehicle-to-everything terminal based on the security credential. After the verification succeeds, the vehicle-to-everything server selects a proper certificate server to apply for a certificate for the vehicle-to-everything terminal. There may be a plurality of methods in which the vehicle-to-everything server selects a certificate server. The vehicle-to-everything server may select, based on one or more of permission, authorized area information, and location information of the vehicle-to-everything terminal, a corresponding certificate server to apply for a certificate. The permission and the authorized area information of the vehicle-to-everything terminal based on which the vehicle-to-everything server selects a certificate may be extracted from the security credential provided by the vehicle-to-everything terminal, or may be information preconfigured in the vehicle-to-everything server. If the security credential includes the information, the information included in the security credential is used as a basis.

On a basis of the foregoing method, this application further provides a solution that can provide transport layer security and application layer security. A certificate of a vehicle-to-everything server is preconfigured in a vehicle-to-everything terminal, and a pre-provisioning certificate of the vehicle-to-everything terminal is preconfigured in the vehicle-to-everything server. In addition, the vehicle-to-everything server, an enterprise server, and the certificate server mutually preconfigure respective certificates. Based on these certificates, a vehicle and the vehicle-to-everything server, the vehicle-to-everything server and a pseudonym certificate server, and an automotive enterprise server and the vehicle-to-everything server may mutually perform authentication on respective identities, and establish a transport layer security connection, for example, establish a secure transmission channel based on Transport Layer Security (TLS), so as to ensure transport layer security. In addition, in the foregoing method procedure, a sender adds a digital signature generated based on a certificate of the sender to a to-be-sent message, and a receiver may perform verification on the digital signature of the sender based on a public key in the certificate, so as to implement integrity protection on transmitted content and perform identity verification on the sender, thereby ensuring application layer security.

The digital certificate application method provided in this application relates to the vehicle-to-everything terminal (or a vehicle-to-everything communications apparatus built in the vehicle-to-everything terminal), the vehicle-to-everything server, and the certificate server, and may further relate to the vehicle-to-everything terminal production enterprise server. Therefore, this application further provides an apparatus and a server for implementing the foregoing method.

In addition, this application further provides a computer-readable storage medium. The computer-readable storage medium stores an instruction, and when the instruction is run on a computer, the computer is enabled to perform the foregoing digital certificate application method.

Finally, this application provides a computer program product including an instruction. When the computer program product is run on a computer, the computer is enabled to perform the foregoing digital certificate application method.

DESCRIPTION OF EMBODIMENTS

Figure 1:
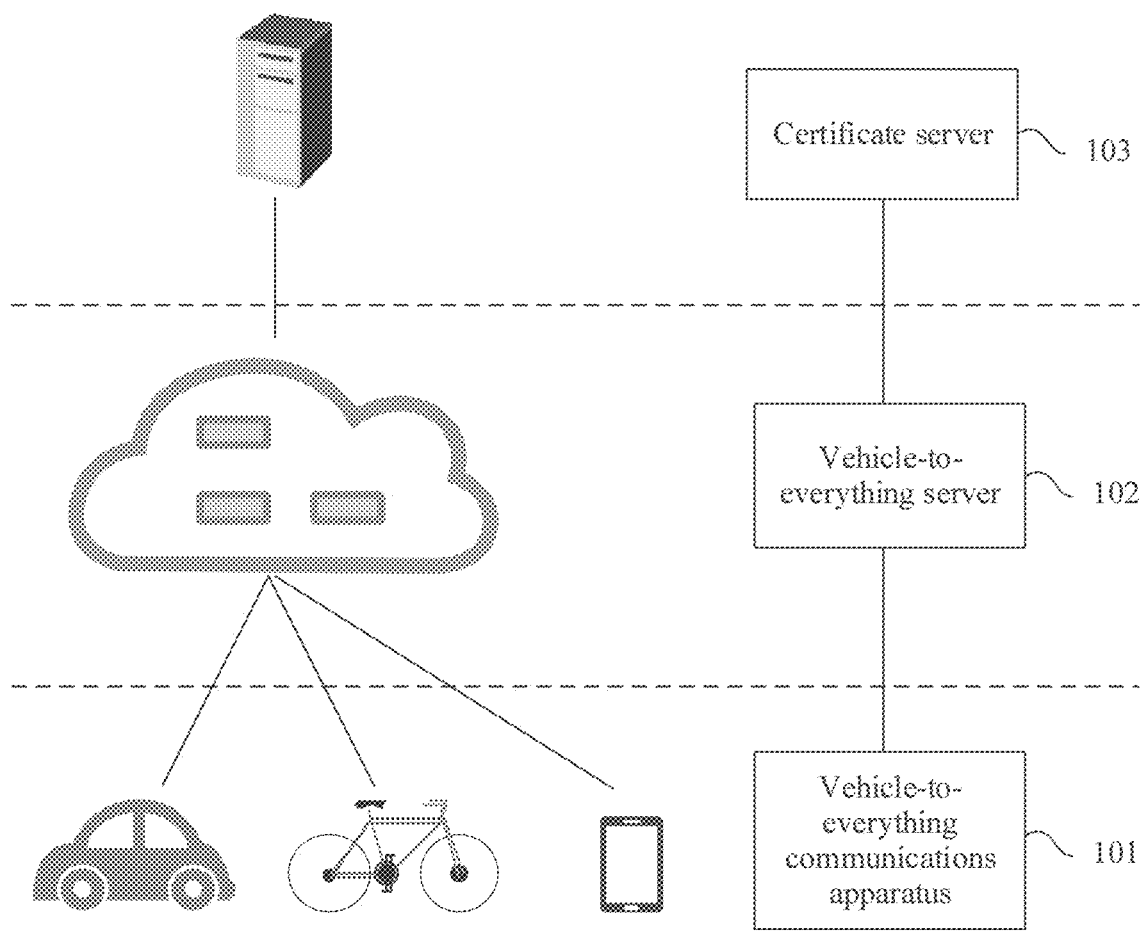
FIG. 1 is a schematic diagram of an architecture of a digital certificate application solution according to an embodiment of this application.

FIG. 1 is a diagram of an architecture of a system for obtaining a vehicle-to-everything certificate according to an embodiment of this application. The figure includes a vehicle-to-everything communications apparatus 101, a vehicle-to-everything server 102, and a certificate server 103.

The vehicle-to-everything communications apparatus 101 may be specifically a vehicle-to-everything terminal, or a functional unit or a chip integrated into the vehicle-to-everything terminal. In this application, a type of the vehicle-to-everything terminal is not limited. The vehicle-to-everything terminal may be a vehicle, a non-motor vehicle, a road side unit (RSU), a portable device, a wearable device, or the like. When the vehicle-to-everything terminal is a vehicle, the functional unit integrated into the vehicle-to-everything terminal may be specifically a telematics box (T-Box), a domain controller (DC), a multi domain controller (MDC), an on-board unit (OBU), or the like integrated into the vehicle.

The vehicle-to-everything server 102 may be a vehicle-to-everything platform or a vehicle-to-everything server that manages the vehicle-to-everything terminal. A specific deployment form of the vehicle-to-everything server is not limited in this application. Specifically, the vehicle-to-everything server may be deployed in the cloud, or may be an independent computer device, or the like.

The certificate server 103 may be specifically a certificate server configured to perform enrollment management or issue a long-term certificate, and is generally referred to as an enrollment certificate server or a long-term certificate server. For example, an enrollment certificate server in the CCMS is an enrollment authority (A), and an enrollment certificate server in the SCMS is an enrollment certificate authority (ECA). A certificate issued by the enrollment certificate server is referred to as an enrollment certificate or a long-term certificate. Alternatively, the certificate server 103 may be a certificate server that issues a short-term certificate, and is generally referred to as a pseudonym certificate server, a short-term certificate server, or a service certificate server. For example, a pseudonym certificate server in the CCMS is an authorization authority (AA), and a pseudonym certificate server in the SCMS is a pseudonym certificate authority (PCA). A certificate issued by the pseudonym certificate server is referred to as a short-term certificate, or may be referred to as a pseudonym certificate or an authorization ticket. A validity period of the pseudonym certificate is shorter than that of the enrollment certificate, so that the vehicle-to-everything terminal needs to periodically apply for updating, so as to prevent third-party tracing, thereby implementing privacy protection. During actual application, a plurality of certificate servers are usually deployed. For example, different certificate servers are deployed in different regions and administrative divisions, or different certificate servers are deployed for issuing certificates with different permission levels.

It should be noted that a certificate described in the embodiments of this application is a digital certificate, and the certificate includes information such as an identifier used to identify an identity of a certificate holder and a public key. If A holds a certificate of B, a message sent by B to A carries a digital signature generated by using the certificate. Specifically, the digital signature is generated by encrypting partial content (for example, a header and a payload or hashes of the header and the payload) in the message by using a private key corresponding to the certificate of B. In this case, after receiving the message, A may decrypt the digital signature by using a public key in the certificate of B, and verify whether the header and the payload in the message are consistent with content obtained through decryption, so as to prevent the message from being tampered with, thereby implementing integrity protection on the message. In addition, the digital signature generated by using the private key corresponding to the certificate of B can be decrypted only by using the public key included in the certificate of B. Therefore, A may further perform identity verification on a message sender by performing verification on the digital signature of B, to prove that the message is sent by B.

It should be further noted that, in the embodiments of this application, a method or a process of calculating (for example, encrypting) partial content in a message by using a private key corresponding to a certificate, to generate a digital signature, and adding the digital signature to the message is also referred to as a method or a process of signing or digitally signing a message, and a method or a process in which a message receiver decrypts a digital signature included in a message by using a public key included in a certificate of a sender, and performs identity verification on the message sender and verification on message integrity is also referred to as a method or a process of performing verification on a digital signature of a message or performing verification on a digital signature.

The solutions in the embodiments of this application may further relate to an enterprise server. When the vehicle-to-everything communications apparatus is a vehicle-to-everything terminal that independently runs or that is independently used, the enterprise server is a server or a platform used by a vehicle-to-everything communications apparatus production enterprise to manage the vehicle-to-everything communications apparatus. Alternatively, when the vehicleto-everything communications apparatus is a functional unit integrated into the vehicle-to-everything terminal, the enterprise server is a server used by a vehicle-to-everything terminal production enterprise to manage the vehicle-to-everything terminal. In the embodiments of this application, the enterprise server may import initial information or pre-provisioning information of the vehicle-to-everything terminal into the vehicle-to-everything server, for example, a pre-provisioning certificate of the vehicle-to-everything terminal, authorized area information of the vehicle-to-everything terminal, and permission information of the vehicle-to-everything terminal. The enterprise server may further generate a security credential for the vehicle. The security credential includes the initial information of the vehicle-to-everything terminal and a digital signature of the enterprise server. The vehicle-to-everything platform, the enterprise server, and the certificate server may mutually preconfigure respective certificates to perform identity verification and establish a secure channel, thereby implementing secure message and information transmission.

It should be noted that the authorized area information of the vehicle-to-everything terminal is used to indicate an area in which the vehicle-to-everything terminal can be authorized to travel or run. For example, for a vehicle, this area may be a home area of a license plate of the vehicle, or an area in which the vehicle can be authorized to travel. For example, authorized area information of a vehicle sold in China may include all provinces in China, but does not include regions outside China. For another example, some special vehicles may be used only in some campuses and cannot be used outside the campuses. The permission information of the vehicle-to-everything terminal is used to indicate or limit a specific type of message that can be sent by a vehicle and specific content that can be carried in a specific type of message. For example, the permission information of the vehicle-to-everything terminal limits one or more types of messages that can be sent by the vehicle, for example, a cooperative awareness message (CAM), a decentralized environmental notification message (DENM), or a basic safety message (BSM), and may further specifically limit specific content that can be sent when the vehicle-to-everything terminal sends the DEN M message, for example, a weather alarm or a road condition alarm.

Based on the architecture shown in FIG. 1, the following further describes a method provided in this application. The vehicle is a typical vehicle-to-everything terminal. In the following embodiments, the vehicle is used as an example for description. A person skilled in the art should understand that, in this application, an embodiment in which a vehicle is used as an example may alternatively be used in another type of vehicle-to-everything terminal. It should be further understood that, a method procedure related to the vehicle described in the following embodiments of this application is actually implemented by a vehicle-to-everything communications apparatus integrated into the vehicle, in other words, a function related to the vehicle in this application is provided by the vehicle-to-everything communications apparatus integrated into the vehicle.

Figure 2:
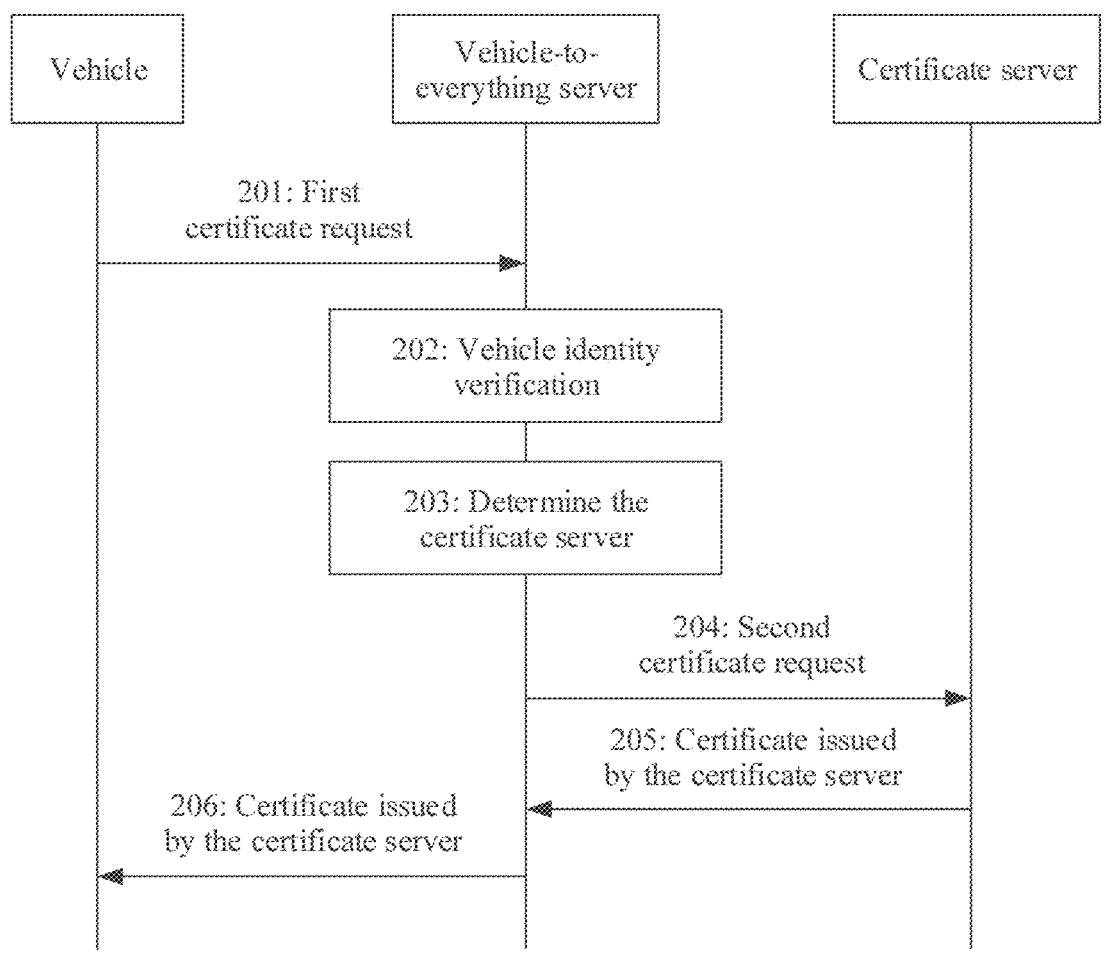
FIG. 2 is a schematic flowchart of a digital certificate application method according to an embodiment of this application.

First, a method provided in an embodiment of this application is briefly described by using a flowchart shown in FIG. 2 as an example.

201. A vehicle-to-everything server receives a first certificate request from a vehicle, where the first certificate request includes a security credential of the vehicle. The security credential in this embodiment of this application is a credential that can be used to perform identity verification on the vehicle, and a specific form of the security credential is not limited. For example, the security credential may be a credential that is issued by an enterprise server (for example, an automotive enterprise server) to the vehicle and that is used to identify an identity of the vehicle, or may be a digital signature generated by the vehicle by using a pre-provisioning certificate of the vehicle.

202. The vehicle-to-everything server performs identity verification on the vehicle based on the security credential. The vehicle-to-everything server is connected to massive vehicle-to-everything terminals. For security purposes, the vehicle-to-everything server first needs to determine whether the vehicle is authorized, and only when the identity verification on the vehicle succeeds, the vehicle-to-everything server can apply for a certificate for the vehicle. The vehicle-to-everything server performs corresponding security credential verification based on different security credential types. If the security credential is the credential issued by the automotive enterprise server to the vehicle, the vehicle-to-everything server may perform verification by performing verification on a digital signature in the security credential, or may send the security credential to the automotive enterprise server for verification. If the security credential is the digital signature generated by the vehicle by using the pre-provisioning certificate of the vehicle, the vehicle-to-everything server needs to perform verification on the digital signature of the vehicle by using the preconfigured pre-provisioning certificate of the vehicle. There are a plurality of implementations for security credential types and security credential verification. No enumeration is listed in this embodiment of this application. Various security credential types and security credential verification manners are all applicable to the main solution and the main procedure in this embodiment of this application. In the following embodiments, the solutions provided in the embodiments of this application are further described based on several specific security credential types.

203. During actual deployment, different certificate servers are deployed in different regions and administrative divisions, or different levels of certificate servers are deployed in countries or regions to issue certificates with different permission levels or permission ranges. Therefore, in addition to performing identity verification on the vehicle, the vehicle-to-everything server further needs to select, based on an authorized area of the vehicle, permission information of the vehicle, current geographical location information of the vehicle, or a combination of the foregoing pieces of information, a specific certificate server to apply for a certificate.

204. The vehicle-to-everything server sends a second certificate request to the selected certificate server, to replace the vehicle to apply to the certificate server for a certificate. For security purposes, the second certificate request carries indication information and a security credential of the vehicle-to-everything server. The indication information is used to indicate the certificate server. The request is a certificate request that the vehicle-to-everything server replaces the vehicle to send. The security credential of the vehicle-to-everything server is used by the certificate server to perform identity verification on the vehicle-to-everything server. Similar to the security credential of the vehicle, there may be a plurality of security credentials of the vehicle-to-everything server and security credential verification methods, which is described by using examples in the following embodiments of this application.

205. The vehicle-to-everything server receives the certificate issued by the certificate server, and sends the certificate to the vehicle. After obtaining the certificate, the vehicle may add the certificate to a subsequently sent vehicle-to-everything message, and add, to the message, a digital signature obtained by calculating the message by using a private key corresponding to the certificate. A vehicle that receives the vehicle-to-everything message may perform identity verification on the message sender and verification on integrity of the message based on a public key in the digital signature.

The method shown in FIG. 2 does not limit a type of the certificate server, and the certificate server may be an enrollment certificate server, or may be a pseudonym certificate server. If the certificate server is an enrollment certificate server, the certificate issued in step 204 and step 205 is an enrollment certificate, or if the certificate server is a pseudonym certificate server, the certificate issued in step 204 and step 205 is a pseudonym certificate. According to the method shown in FIG. 2, the vehicle-to-everything server shields massive vehicle-to-everything terminals for the certificate server. Therefore, the certificate server does not need to directly face the massive vehicle-to-everything terminals, and does not need to preconfigure security information of the vehicle-to-everything terminal (for example, the pre-provisioning certificate of the vehicle) that is used to establish a secure connection to the vehicle-to-everything terminal. In other words, the certificate server does not need to directly establish a one-to-one secure connection to the massive vehicle-to-everything terminals, and only needs to communicate with the vehicle-to-everything server. This simplifies configuration of the certificate server, and reduces a security risk of the certificate server. In addition, the vehicle-to-everything server shields complex networking or a complex architecture on a certificate server side for the vehicle-to-everything terminal. Therefore, the vehicle-to-everything terminal does not need to be aware of the deployment networking or architecture of the certificate server, and only needs to communicate with the vehicle-to-everything server to apply for a required certificate. This simplifies configuration on a vehicle-to-everything terminal side, and the vehicle-to-everything terminal can obtain a certificate through the vehicle-to-everything server only by configuring information on a vehicle-to-everything server side.

Figure 3:
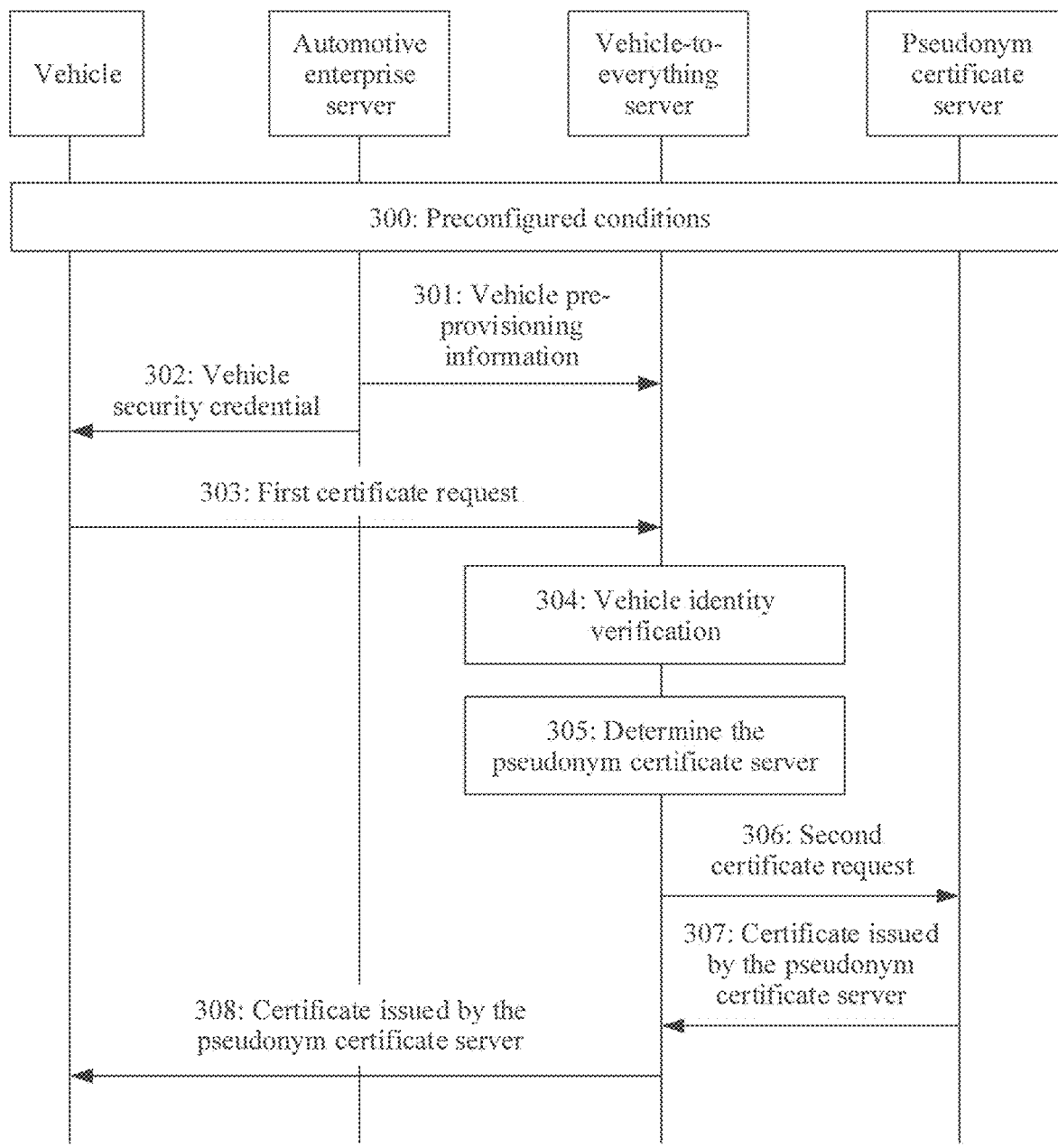
FIG. 3 is a schematic flowchart of a direct pseudonym certificate application method according to an embodiment of this application.

A method procedure shown in FIG. 3 is a possible technical implementation of the brief solution in FIG. 2.

300. The method procedure shown in FIG. 3 needs the following preconfigured conditions.

On a vehicle, a certificate and an address of the vehicle-to-everything server are preconfigured, and a pre-provisioning certificate of the vehicle or a key pair (including a public key Kp1 and a private key Kq1) corresponding to the pre-provisioning certificate further needs to be preconfigured.

The vehicle-to-everything server, the automotive enterprise server, and the pseudonym certificate server mutually preconfigure respective certificates.

The pre-provisioning certificate of the vehicle, the preconfigured certificate of the vehicle-to-everything server, the preconfigured certificate of the automotive enterprise server, and the preconfigured certificate of the pseudonym certificate server each may be in an X.509 format. The certificates each include information such as an identifier and a public key. Based on these certificates, the vehicle and the vehicle-to-everything server, the vehicle-to-everything server and the pseudonym certificate server, and the automotive enterprise server and the vehicle-to-everything server may mutually perform identity authentication and establish a transport layer security connection. In addition, the vehicle and the vehicle-to-everything server, the vehicle-to-everything server and the pseudonym certificate server, and the automotive enterprise server and the vehicle-to-everything server may perform verification on respective digital signatures based on public keys in the certificates, so as to implement integrity protection on transmitted content. For example, a message sent by the vehicle-to-everything server to the pseudonym certificate server may carry a digital signature generated by using the certificate of the vehicle-to-everything server, and the pseudonym certificate server performs verification on the digital signature of the vehicle-to-everything server by using the public key in the preconfigured certificate of the vehicle-to-everything server, so as to ensure integrity of message content.

301. The vehicle-to-everything server obtains pre-provisioning information of the vehicle from the automotive enterprise server, where the pre-provisioning information includes the pre-provisioning certificate of the vehicle, and may further include authorized area information and permission information of the vehicle that are specified by an automotive enterprise.

302. The automotive enterprise server allocates a security credential to the vehicle, and preconfigures the security credential in the vehicle. In this embodiment of this application, the security credential is a token, and includes at least an identifier of the vehicle. The identifier of the vehicle is used to uniquely identify the vehicle, for example, a vehicle identification number (VIN) code, a pseudo VIN code, or a random number that ensures uniqueness. The security credential includes a digital signature generated by the automotive enterprise server based on partial content in the security credential by using the certificate of the automotive enterprise server, so as to ensure integrity of the security credential and prevent the security credential from being tampered with. Specifically, the automotive enterprise server encrypts a header and a payload of the token by using a private key corresponding to the certificate of the automotive enterprise server. A result obtained through encryption is included in the token as the digital signature of the automotive enterprise server. Optionally, the token further includes the authorized area information, the permission information, and the like of the vehicle that are specified by the automotive enterprise. It should be noted that there is no time sequence between steps 301 and message 302, and serial numbers herein are only used to distinguish between the messages, but do not limit a sequence.

TABLE 1

Token example

| Header | { <br> "alg": "HS256", <br> "typ": "JWT" <br> } | Alg usually uses an SHA256-based hash-based message authentication code (HMAC) algorithm (HS256) or an RSA-based secure hash algorithm (SHA)-256 algorithm (RS256). An algorithm department of each country usually has a further algorithm requirement, for example, SM2 (China), NistP256 (US), and BrainpoolP256r1 (Europe). |
| --- | --- | --- |
| Payload | { <br> "iss": automotive enterprise server identifier, | The payload includes a body of the token, "iss" is a message issuer, "aud" is a |

TABLE 1-continued

Token example

| | | |
|---|---|---|
| | "aud": vehicle-to-everything server identifier<br>"sub": carID,<br>"iat": time stamp<br>"exp": expiration time<br>"scope": permission information and the like<br>} | token verifier, and "sub" is a token holder. Left instances are some fields of the token, and the other fields are not listed. |
| Digital signature | HMAC-SHA256(<br>base64urlEncoding(header)<br>+ '.' +<br>base64urlEncoding(payload),<br>secret<br>) | The digital signature part is obtained by the token issuer by performing overall calculation on the header and the payload based on the algorithm mentioned in the header and a private key of the issuer. |

303. When the vehicle needs to obtain a certificate or update a certificate, the vehicle sends a certificate request to the vehicle-to-everything server, to request the vehicle-to-everything server to apply for the certificate for the vehicle. For ease of description, the certificate request sent by the vehicle to the vehicle-to-everything server is also referred to as a first certificate request in this embodiment of this application. The first certificate request carries the security credential obtained in step 302 and a public key Kp2. The identifier of the vehicle in the security credential is used to prove an identity of the vehicle to the vehicle-to-everything server. Kp2 is a public key in a key pair (including the public key Kp2 and a private key Kq2) generated by the vehicle based on a preconfigured root key (for example, preconfigured in a vehicle production stage). The private key Kq2 is stored by the vehicle, and the public key Kp2 is delivered to the certificate server through the vehicle-to-everything server, so that the public key Kp2 is included in the certificate issued by the certificate server to the vehicle. Optionally, the vehicle may further generate another key pair (including a public key Kp3 and a private key Kq3). The vehicle stores the private key Kq3 in the key pair, sends a request message including the public key Kp3 to the vehicle-to-everything server, and sends the public key Kp3 to the certificate server through the vehicle-to-everything server. The certificate server encrypts the issued certificate by using Kp3, to reduce a security risk in a process in which the vehicle-to-everything server sends the certificate to the vehicle, for example, to prevent the vehicle-to-everything server from tampering with the certificate. It should be noted that, because the certificate of the vehicle-to-everything server is preconfigured in the vehicle and the pre-provisioning certificate of the vehicle is preconfigured in the vehicle-to-everything server, the vehicle and the vehicle-to-everything server may mutually perform identity authentication and establish a secure transmission channel for two-way authentication, for example, a transport layer security connection. The secure transmission channel between the vehicle and the vehicle-to-everything server may be established before the certificate request is sent, or may be established after the certificate request is sent. A difference lies in that, if the secure transmission channel is established after the vehicle sends the certificate request, when the vehicle-to-everything server receives the certificate request, the vehicle-to-everything server temporally does not process the certificate request of the vehicle because a secure connection to the vehicle is not established, and processes the certificate request of the vehicle after the secure transmission channel is established.

304. The vehicle-to-everything server receives the first certificate request of the vehicle, extracts the token from the request, and performs verification on the digital signature of the automotive enterprise server that is included in the token based on the preconfigured certificate of the automotive enterprise server. Specifically, the vehicle-to-everything server decrypts the digital signature of the automotive enterprise server in the token by using the public key in the certificate of the automotive enterprise server, and compares content of a digital signature obtained through decryption with content of the header and the payload in the token. If the content of the digital signature obtained through decryption is consistent with the content of the header and the payload in the token, the verification on the digital signature succeeds, and the vehicle-to-everything server further extracts the identifier of the vehicle from the token, and compares the identifier of the vehicle in the token with the identifier of the vehicle in the preconfigured pre-provisioning certificate of the vehicle. If the identifier of the vehicle that is carried in the token is consistent with the identifier of the vehicle in the pre-provisioning certificate of the vehicle, the identity verification on the vehicle succeeds. By performing step 304, the vehicle-to-everything server further performs, based on the transport layer security channel, security authentication on the identity of the vehicle transmitted at an application layer, so as to improve a security level. If the identity verification fails, the vehicle-to-everything server discards the certificate request of the vehicle and does not need to perform further processing.

305. The vehicle-to-everything server selects a pseudonym certificate server based on at least one of the authorized area information and the permission information of the vehicle. If the token includes authorized area information and permission information, the vehicle-to-everything server selects the pseudonym certificate server based on the authorized area information and the permission information included in the token, and sends a second certificate request. Alternatively, if the token does not include authorized area information and permission information, the vehicle-to-everything server selects the pseudonym certificate server based on the authorized area information and the permission information of the vehicle that are obtained from the automotive enterprise server in step 301, and sends the second certificate request.

306. The vehicle-to-everything server sends the second certificate request to the selected pseudonym certificate server. The request includes the public key Kp2 of the vehicle. Optionally, the request further includes one or more pieces of information such as indication information, the public key Kp3 of the vehicle, the permission information of the vehicle, and the digital signature of the vehicle-to-everything server. The indication information included in the request is used to indicate to the certificate server that the request is a certificate request that the vehicle-to-everything server replaces the vehicle to send. Kp2 included in the request is used to enable the pseudonym certificate server to add the public key information to a pseudonym certificate. The public key Kp3 of the vehicle included in the request is used by the pseudonym certificate server to encrypt the pseudonym certificate issued to the vehicle. Because only the vehicle has the private key Kq3 corresponding to Kp3, only the vehicle can decrypt the pseudonym certificate, so that the pseudonym certificate is prevented from being tampered with during transmission. The authorized area information and the permission information included in the request are used to enable the certificate server to add permission information authorized by the certificate server to the issued certificate. The digital signature of the vehicle-to-everything server included in the request is used by the certificate server to perform identity verification on the vehicle-to-everything server, so as to implement integrity protection on the message during transmission.

307. The pseudonym certificate server issues the pseudonym certificate for the vehicle and sends the pseudonym certificate to the vehicle-to-everything server. The pseudonym certificate includes the public key Kp2 of the vehicle, and may further include other information such as the permission information authorized by the pseudonym certificate server for the vehicle. When the message in step 306 includes Kp3, the pseudonym certificate server encrypts the pseudonym certificate by using Kp3, and then sends an encrypted pseudonym certificate to the vehicle-to-everything server. A format of the pseudonym certificate is not limited in this application, and the pseudonym certificate may be a certificate that complies with the Institute of Electrical and Electronics Engineers (IEEE) 1609.2 specification, or may be a certificate in another format.

308. The vehicle-to-everything server sends the pseudonym certificate or the encrypted pseudonym certificate to the vehicle.

A person skilled in the art should understand that, although FIG. 3 describes the certification application method procedure by using the pseudonym certificate server as an example, the method procedure shown in FIG. 3 is applicable to any type of certificate server. The vehicle and the vehicle-to-everything server may further apply to another type of certificate server for a corresponding certificate by using the method procedure shown in FIG. 3.

Figure 4:
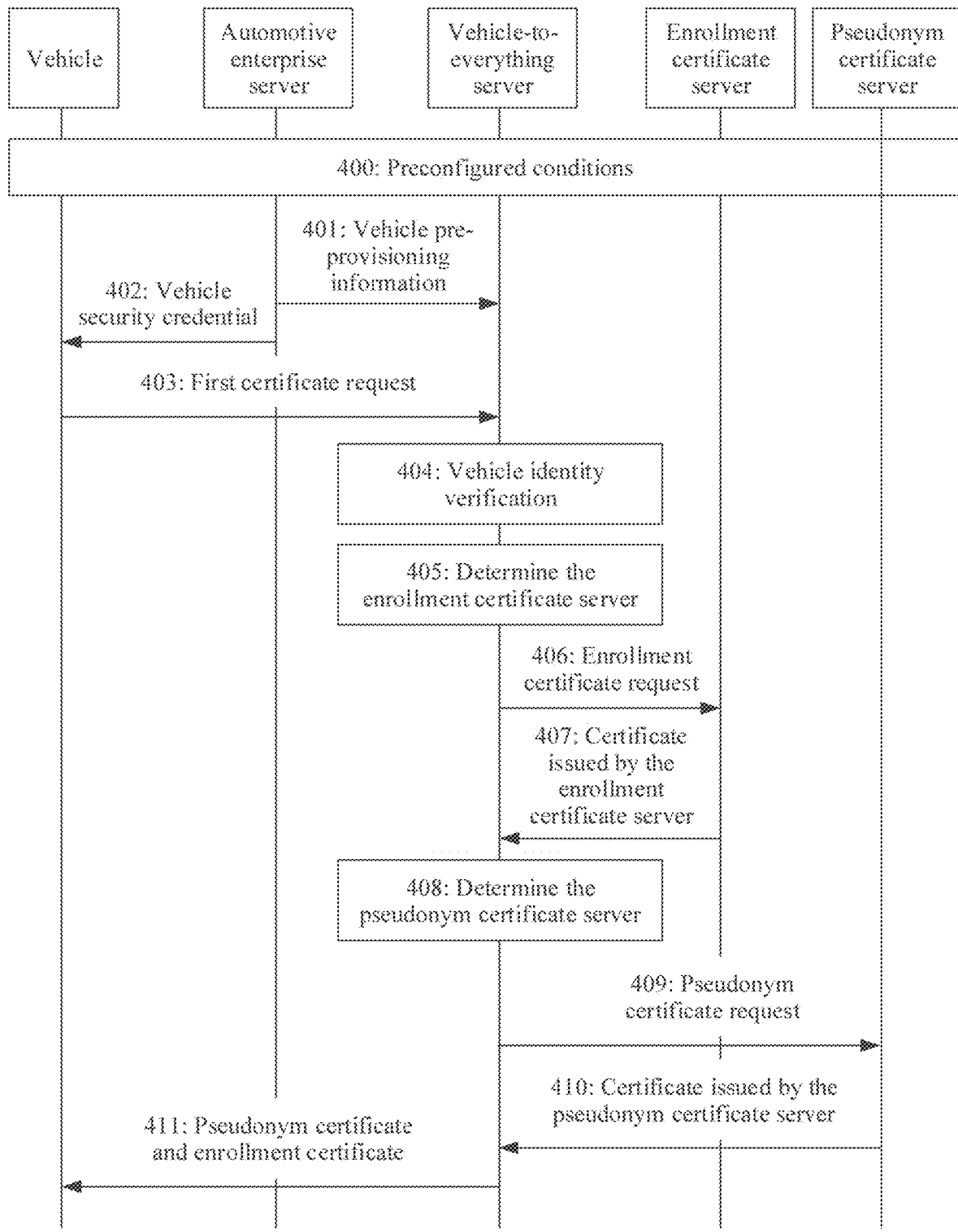
FIG. 4 is a schematic flowchart of a method for first applying for an enrollment certificate and then applying for a pseudonym certificate according to an embodiment of this application.

According to the method shown in FIG. 2, after receiving the first certificate request in step 201, the vehicle-to-everything server may send the second certificate request to one certificate server, or may send the certificate request to a plurality of certificate servers to request a plurality of certificates. FIG. 4 shows an example in which a vehicle-to-everything server applies to a plurality of certificate servers for certificates.

Compared with FIG. 3, FIG. 4 includes two certificate servers an enrollment certificate server and a pseudonym certificate server. The following describes a method in FIG. 4 in comparison with the method in FIG. 3, mainly describes a difference from the method in FIG. 3, and does not describe a same part as the method in FIG. 3 again.

400. The preconfigured conditions described in step 300 in FIG. 3 are still applicable to the method in FIG. 4. In addition, the vehicle-to-everything server and the enrollment certificate server further need to preconfigure respective certificates. Optionally, the vehicle-to-everything server and the enrollment certificate server may establish a transport layer security channel by using the respective certificates.

401 to 404. Refer to the descriptions of step 301 to step 304 in FIG. 3.

405. The vehicle-to-everything server selects an enrollment certificate server based on at least one of the authorized area information and the permission information of the vehicle.

406. The vehicle-to-everything server sends an enrollment certificate request to the selected enrollment server, where the request includes the identifier of the vehicle, the permission information of the vehicle, and the public key Kp1 of the vehicle. Kp1 may be sent by the vehicle to the vehicle-to-everything server through the message in step 403, or may be a public key extracted by the vehicle-to-everything server from the pre-provisioning certificate of the vehicle. Similar to the message in step 306, the enrollment certificate request may further include indication information and a digital signature of the vehicle-to-everything server. For functions of the indication information and the digital signature of the vehicle-to-everything server, refer to the descriptions in step 306.

407. The enrollment certificate server issues an enrollment certificate for the vehicle and sends the enrollment certificate to the vehicle-to-everything server. The enrollment certificate may be in an IEEE 1609.2 format or another format. The enrollment certificate issued by the enrollment certificate server for the vehicle includes permission information authorized by the enrollment certificate server and the public key Kp1 of the vehicle, and may further include information such as authorized area information authorized by the enrollment certificate server.

408. The vehicle-to-everything server selects a pseudonym certificate server based on at least one of the authorized area information and the permission information of the vehicle that are included in the enrollment certificate.

409. The vehicle-to-everything server sends a pseudonym certificate request to the selected pseudonym certificate server. The request includes the public key Kp2 of the vehicle and the enrollment certificate, and may further include one or more pieces of information such as indication information, the public key Kp3 of the vehicle, the permission information of the vehicle, and the digital signature of the vehicle-to-everything server.

410. The pseudonym certificate server issues a pseudonym certificate for the vehicle and sends the pseudonym certificate to the vehicle-to-everything server. For details, refer to step 307.

411. The vehicle-to-everything server sends the obtained enrollment certificate and the obtained pseudonym certificate to the vehicle. The vehicle adds the certificates to a subsequently sent vehicle-to-everything message, and signs the message by using the certificates.

It should be noted that, in the method shown in FIG. 4, the vehicle-to-everything server first needs to obtain the enrollment certificate of the vehicle, and then applies for the pseudonym certificate. A validity period of the enrollment certificate is longer than that of the pseudonym certificate. The enrollment certificate does not need to be applied for when each pseudonym certificate is applied for. If the vehicle-to-everything server determines that the vehicle has a corresponding enrollment certificate after step 404, step 405 to step 407 may be skipped, and step 408 is directly performed.

Figure 5:
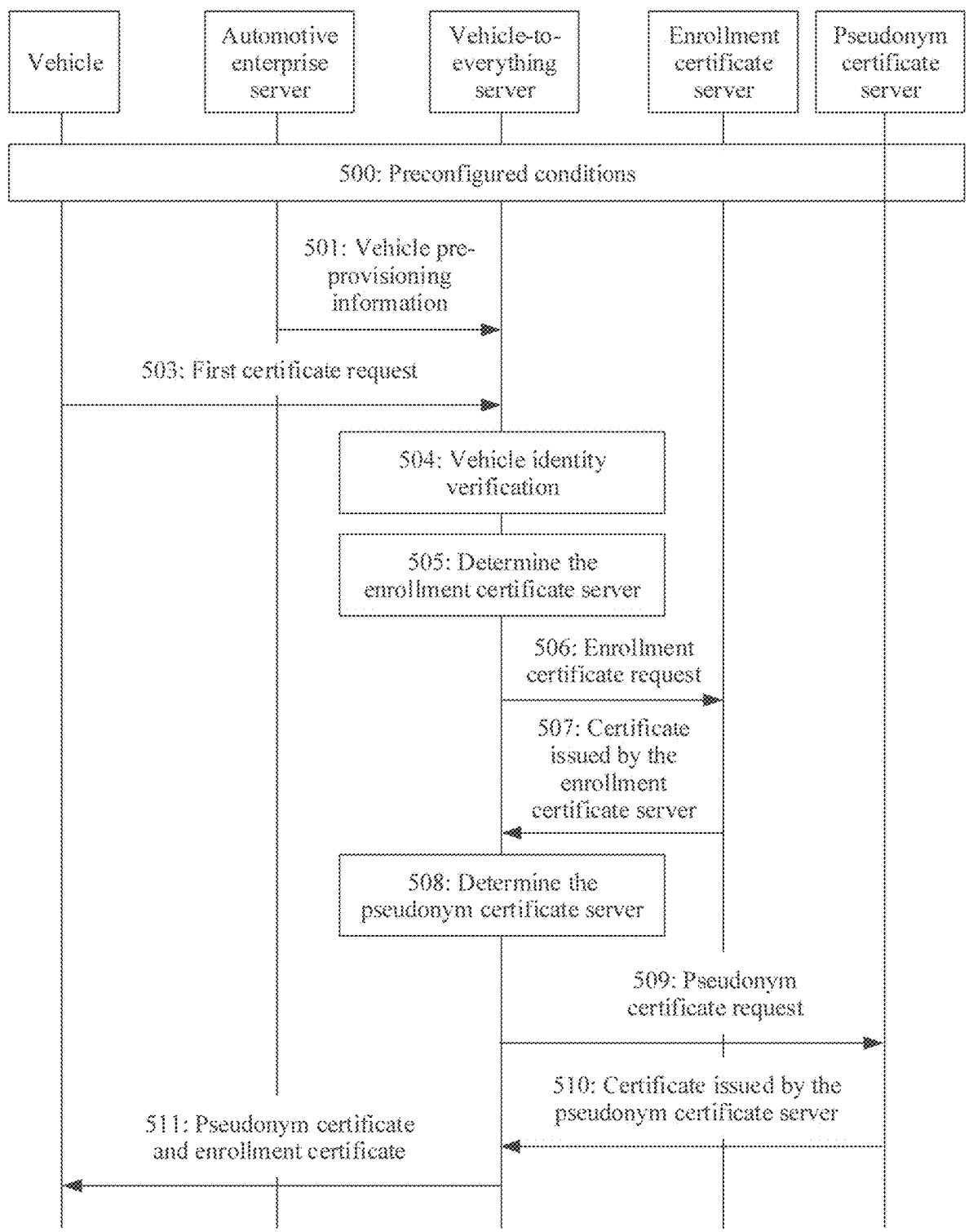
FIG. 5 is a schematic flowchart of another pseudonym certificate application method according to an embodiment of this application.

In the method shown in FIG. 3 and the method shown in FIG. 4, the security credential sent by the vehicle to the vehicle-to-everything server through the message in step 303 and the message in step 403 is generated by the automotive enterprise server and is preconfigured in the vehicle. During actual deployment, the vehicle may alternatively generate the security credential. As shown in FIG. 5, an embodiment of this application provides another specific implementation of the method shown in FIG. 2. The following describes a method in FIG. 5 in comparison with the method in FIG. 4, mainly describes a difference from the method in FIG. 4, and does not describe a same part as the method in FIG. 4 again.

500. The preconfigured conditions described in step 400 in FIG. 4 are applicable to the method described in FIG. 5. In addition, the identifier of the vehicle further needs to be preconfigured in the vehicle. The identifier of the vehicle may be configured in the vehicle by the automotive enterprise server at a production stage, or may be configured in another manner.

501. Refer to the descriptions of step 401.

503. Compared with the method in FIG. 4, in the method in FIG. 5, the automotive enterprise server does not need to allocate a security credential to the vehicle and transfer the security credential, and a step similar to step 302 or step 402 is not required in FIG. 5. Compared with step 303 or step 403, the first certificate request sent by the vehicle includes the identifier of the vehicle, the public key Kp2, and optionally, further includes the public key Kp3. The vehicle signs the first certificate request message by using the pre-provisioning certificate.

504. The vehicle-to-everything server receives the first certificate request of the vehicle, and performs verification on the digital signature of the message in step 503 by using the pre-provisioning certificate of the vehicle. After the verification succeeds, the vehicle-to-everything server extracts the identifier of the vehicle from the first certificate request, and compares the identifier of the vehicle in the first certificate request with the identifier of the vehicle in the preconfigured pre-provisioning certificate of the vehicle. If the identifier of the vehicle that is carried in the first certificate request is consistent with the identifier of the vehicle in the pre-provisioning certificate of the vehicle, identity verification on the vehicle succeeds.

Step 505 to step 511 are the same as step 405 to step 411 in FIG. 4, and details are not described herein again.

In this embodiment of this application, there may be a plurality of implementations of a method in which the vehicle-to-everything server determines a certificate server (such as step 203, step 305, step 405, step 408, step 505, or step 508). Considering a difference between network deployment situations or a difference between policies and regulations in regions, or service features in different service scenarios, the vehicle-to-everything server may select a certificate server in a plurality of manners. This is not limited in this embodiment of this application. For example, the vehicle-to-everything server may select a certificate server based on an authorized area of the vehicle or permission information of the vehicle, or may select a certificate server based on current location information of the vehicle. In other words, the vehicle carries the location information of the vehicle in the first certificate request, for example, Global Positioning System (GPS) positioning information. The vehicle-to-everything server selects a certificate server such as an enrollment certificate server or a pseudonym certificate server based on the location information of the vehicle.

The foregoing mainly describes the solutions provided in the embodiments of this application from the perspective of the method procedure. It can be understood that, to implement the foregoing functions, entities such as the vehicle, the automotive enterprise server, the vehicle-to-everything server, and various certificate servers in the embodiments of this application include corresponding hardware structures and/or software modules for performing the functions. A person skilled in the art should be easily aware that the method procedure described with reference to the embodiments disclosed in this specification may be implemented by hardware or a combination of hardware and computer software in the present disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 6:
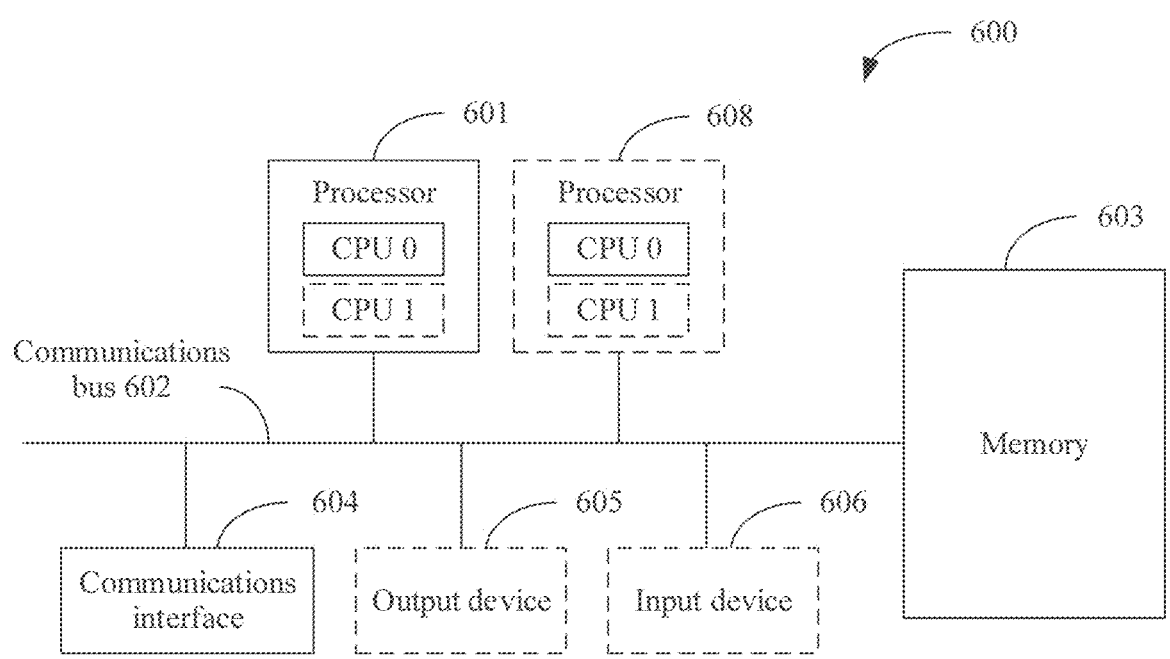
FIG. 6 is a schematic structural diagram of an apparatus according to an embodiment of this application.

For example, the vehicle-to-everything communications apparatus integrated into the vehicle-to-everything terminal, the automotive enterprise server, the vehicle-to-everything server, and the various certificate servers in the foregoing embodiments may all be implemented by an apparatus shown in FIG. 6.

The apparatus 600 includes at least one processor 601, a communications bus 602, a memory 603, and at least one communications interface 604. The apparatus 600 may be a general-purpose computer or server, or a special-purpose computer or server.

The processor 601 may be a general-purpose central processing unit (CPU), a microprocessor, an application-specific integrated circuit (ASIC), or one or more integrated circuits for controlling program execution of the solutions of the present disclosure.

The communications bus 602 may include a path to transmit information between the foregoing components.

The communications interface 604 may be any transceiver, IP port, bus interface, or the like, and is configured to communicate with an internal or external device or apparatus, or a communications network, for example, an Ethernet, a radio access network (RAN), or a wireless local area network (WLAN). For example, when the vehicle-to-everything communications apparatus is a functional unit integrated inside a vehicle, the communications interface 604 of the vehicle-to-everything communications apparatus may include a transceiver that communicates with an external network of the vehicle, and further include a bus interface that communicates with another internal unit of the vehicle, for example, a controller area network (CAN) bus interface.

The memory 603 may be a read-only memory (ROM) or another type of static storage device capable of storing static information and instructions, or may be a random-access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc (DVD), a BLU-RAY disc, and the like), a magnetic disk storage medium or another magnetic storage device, or any other medium capable of including or storing expected program code in a form of an instruction or a data structure and capable of being accessed by a computer. However, the memory 603 is not limited thereto. The memory may exist independently, and is connected to the processor through a bus. Alternatively, the memory may be integrated with the processor.

The memory 603 is configured to store application program code for performing the solutions of the present disclosure, and execution is controlled by the processor 601. The processor 601 is configured to execute the application program code stored in the memory 603, to implement the functions of the automotive enterprise server, the vehicle-to-everything server, or the various certificate servers in the methods in this patent.

During specific implementation, in an embodiment, the processor 601 may include one or more CPUs, for example, a CPU 0 and a CPU 1 in FIG. 6.

During specific implementation, in an embodiment, the apparatus 600 may include a plurality of processors, for example, the processor 601 and a processor 608 in FIG. 6. Each of the processors may be a single-core (single-CPU) processor, or may be a multi-core (multi-CPU) processor. The processor herein may be one or more devices, circuits, and/or processing cores for processing data (for example, a computer program instruction).

During specific implementation, in an embodiment, the apparatus 600 may further include an output device 605 and an input device 606. The output device 605 communicates with the processor 601, and may display information in a plurality of manners. For example, the output device 605 may be a liquid-crystal display (LCD), a light-emitting diode (LED) display device, a cathode-ray tube (CRT) display device, or a projector. The input device 606 communicates with the processor 601, and may receive an input of a user in a plurality of manners. For example, the input device 606 may be a mouse, a keyboard, a touchscreen device, or a sensor device.

When the apparatus shown in FIG. 6 is a chip, a function/an implementation process of the communications interface 604 may be further implemented by using a pin, a circuit, or the like. The memory is a storage unit in the chip, such as a register or a cache. The storage unit may further be a storage unit located outside the chip.

All or some of the foregoing embodiments may be implemented by using software, hardware, firmware, or any combination thereof. When the software is used to implement the embodiments, the embodiments may be implemented all or partially in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a special-purpose computer, a computer network, or another programmable apparatus. The computer program may be loaded on a cloud server, or may be loaded on a locally deployed computer server. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person skilled in the art should understand that the foregoing descriptions are merely specific implementations of this application, but are not intended to limit the protection scope of this application. Any equivalent replacement or improvement made based on the embodiments of this application shall fall within the protection scope of the present disclosure. In the claims, "comprising" does not exclude another component or another step, and "a" or "one" does not exclude a meaning of plurality. A single processor or another unit may implement several functions enumerated in the claims. Some measures are recorded in different dependent claims, but this does not mean that these measures cannot be combined to produce a better effect.

What is claimed is:

1. A method, comprising:
   at a vehicle to everything server:
   receiving, from a vehicle, a first certificate request comprising a security credential of the vehicle;
   performing identity verification on the vehicle based on the security credential;
   determining, when the identity verification on the vehicle succeeds, a certificate server based on at least one of authorized area information of the vehicle, permission information of the vehicle, or geographical location information of the vehicle;
   sending a second certificate request to the certificate server;
   receiving a first certificate from the certificate server; and
   sending the first certificate to the vehicle.

2. The method of claim 1, wherein a pre-provisioning certificate of the vehicle is preconfigured in the vehicle-to-everything server, and wherein the pre-provisioning certificate comprises a first identifier of the vehicle.

3. The method of claim 2, wherein before performing the identity verification on the vehicle, the method further comprises establishing a bidirectional secure channel with the vehicle based on the pre-provisioning certificate.

4. The method of claim 2, wherein a second certificate from an automotive enterprise server to the vehicle is preconfigured in the vehicle-to-everything server, wherein the security credential comprises a second identifier that identifies the vehicle and a digital signature of the automotive enterprise server, and wherein performing the identity verification on the vehicle comprises:
   performing verification on the digital signature based on the second certificate;
   determining, when the verification on the digital signature succeeds, whether the second identifier is consistent with the first identifier; and
   determining that the identity verification on the vehicle succeeds when the second identifier is consistent with the first identifier.

5. The method of claim 4, wherein the security credential further comprises at least one of the authorized area information or the permission information, and wherein the method further comprises further determining the certificate server based on at least one of the authorized area information or the permission information.

6. The method of claim 5, wherein at least one of the authorized area information or the permission information is preconfigured in the vehicle-to-everything server.

7. The method of claim 5, wherein the first certificate request further comprises the geographical location information, and wherein the method further comprises further determining the certificate server based on the geographical location information.

8. The method of claim 2, wherein the first certificate request further comprises a second identifier of the vehicle, wherein the security credential is a digital signature of the vehicle, and wherein performing the identity verification on the vehicle comprises:
   performing verification on the digital signature based on the pre-provisioning certificate;
   determining, when the verification on the digital signature succeeds, whether the second identifier is consistent with the first identifier; and
   determining that the identity verification on the vehicle succeeds when the second identifier is consistent with the first identifier.

9. The method of claim 1, wherein before determining the certificate server, the method further comprises:

applying to an enrollment certificate server for an enrollment certificate, wherein the enrollment certificate comprises the permission information; and determining the certificate server based on the permission information.

10. The method of claim 9, wherein applying to the enrollment certificate server for the enrollment certificate comprises:

determining the enrollment certificate server based on at least one of the geographical location information, the authorized area information, or the permission information;

sending, to the enrollment certificate server, an enrollment certificate request comprising a first identifier of the vehicle, a first public key, and at least one of the authorized area information or the permission information, wherein the first public key is in a pre-provisioning certificate of the vehicle or in the enrollment certificate request; and receiving, from the enrollment certificate server, the enrollment certificate comprising the first public key and the permission information.

11. The method of claim 1, wherein the first certificate request comprises a second public key, and wherein the second certificate request comprises the second public key to enable the certificate server to issue the first certificate comprising the second public key.

12. The method of claim 1, wherein the first certificate request further comprises a third public key, wherein the second certificate request comprises the third public key, and wherein the third public key is configured to encrypt the first certificate.

13. The method of claim 1, wherein the second certificate request comprises a first indication, and wherein the first indication indicates that the second certificate request requests that the vehicle-to-everything server replace the vehicle.

14. The method claim 1, wherein second certificate request further comprises a digital signature of the vehicle-to-everything server.

15. The method of claim 1, wherein the second certificate request further comprises the permission information.

16. A vehicle-to-everything server comprising:

a memory configured to store instructions; and one or more processors coupled to the memory and configured to execute the instructions to cause the vehicle-to-everything server to:

communicate with an apparatus or a device outside the vehicle-to-everything server;

receive, from a vehicle, a first certificate request comprising a security credential of the vehicle;

perform identity verification on the vehicle based on the security credential;

determine, when the identity verification on the vehicle succeeds, a certificate server based on at least one of authorized area information of the vehicle, permission information of the vehicle, or geographical location information of the vehicle;

send a second certificate request to the certificate server;

receive a certificate from the certificate server; and send the certificate to the vehicle.

17. The vehicle-to-everything server of claim 16, wherein a pre-provisioning certificate of the vehicle is preconfigured in the vehicle-to-everything server, and wherein the pre-provisioning certificate comprises a first identifier of the vehicle.

18. The vehicle-to-everything server of claim 17, wherein the one or more processors are further configured to execute the instructions to cause the vehicle-to-everything server to establish, before performing the identity verification on the vehicle, a bidirectional secure channel with the vehicle based on the pre-provisioning certificate.

19. The vehicle-to-everything server of claim 17, wherein a second certificate from an automotive enterprise server to the vehicle is preconfigured in the vehicle-to-everything server, wherein the security credential comprises a second identifier that identifies the vehicle and a digital signature of the automotive enterprise server, and wherein the one or more processors are further configured to execute the instructions to cause the vehicle-to-everything server to perform the identity verification on the vehicle by:

performing verification on the digital signature based on the second certificate;

determining, when the verification on the digital signature succeeds, whether the second identifier is consistent with the first identifier; and determining that the identity verification on the vehicle succeeds when the second identifier is consistent with the first identifier.

20. The vehicle-to-everything server of claim 19, wherein the security credential further comprises at least one of the authorized area information or the permission information, and wherein the one or more processors are further configured to execute the instructions to cause the vehicle-to-everything server to further determine the certificate server based on at least one of the authorized area information or the permission information.

21. The vehicle-to-everything server of claim 20, wherein at least one of the authorized area information or the permission information is preconfigured in the vehicle-to-everything server.

22. The vehicle-to-everything server of claim 20, wherein the first certificate request further comprises the geographical location information, and wherein the one or more processors are further configured to execute the instructions to cause the vehicle-to-everything server to further determine the certificate server based on the geographical location information.

23. The vehicle-to-everything server of claim 17, wherein the first certificate request further comprises a second identifier of the vehicle, wherein the security credential is a digital signature of the vehicle, and wherein the one or more processors are further configured to execute the instructions to cause the vehicle-to-everything server to perform the identity verification on the vehicle:

perform verification on the digital signature based on the pre-provisioning certificate;

determine, when the verification on the digital signature succeeds, whether the second identifier is consistent with the first identifier; and determine that the identity verification on the vehicle succeeds when the second identifier is consistent with the first identifier.

24. A computer program product comprising instructions that are stored on a non-transitory computer-readable medium and that, when executed by one or more processors, cause a vehicle-to-everything server to:

receive, from a vehicle, a first certificate request comprising a security credential of the vehicle;

perform identity verification on the vehicle based on the security credential;

determine, when the identity verification on the vehicle succeeds, a certificate server based on at least one of authorized area information of the vehicle, permission information of the vehicle, or geographical location information of the vehicle;
send a second certificate request to the certificate server;
receive a first certificate from the certificate server; and
send the first certificate to the vehicle.

* * * * *